United States Patent
Dadhia et al.

(10) Patent No.: US 7,523,308 B2
(45) Date of Patent: Apr. 21, 2009

(54) METHOD AND SYSTEM FOR DYNAMIC SYSTEM PROTECTION

(75) Inventors: Rajesh Dadhia, Redmond, WA (US); Sukvinder S. Gill, Sammamish, WA (US); Anders Samuelsson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 795 days.

(21) Appl. No.: 10/918,040

(22) Filed: Aug. 13, 2004

(65) Prior Publication Data
US 2005/0188419 A1   Aug. 25, 2005

Related U.S. Application Data

(60) Provisional application No. 60/547,415, filed on Feb. 23, 2004.

(51) Int. Cl.
*G06F 9/24* (2006.01)

(52) U.S. Cl. .............. 713/166; 713/164; 713/150; 713/151

(58) Field of Classification Search ........... 713/166, 713/164, 150, 151
See application file for complete search history.

(56) References Cited

U.S. PATENT DOCUMENTS

| | | | | |
|---|---|---|---|---|
| 5,557,742 A | * | 9/1996 | Smaha et al. ............ 726/22 |
| 5,796,942 A | * | 8/1998 | Esbensen ............... 726/13 |
| 5,991,881 A | * | 11/1999 | Conklin et al. .......... 726/22 |
| 6,014,715 A | * | 1/2000 | Stoevhase ............. 710/11 |
| 6,070,244 A | * | 5/2000 | Orchier et al. .......... 726/1 |

* cited by examiner

*Primary Examiner*—Thomas R Peeso
(74) *Attorney, Agent, or Firm*—Perkins Coie LLP

(57) ABSTRACT

A method and system for dynamically protecting against exploitation of a vulnerability is provided. The dynamic protection system identifies the security level of an instance of an application that is to execute on a computer system. If the security level of the instance of the application is not appropriate, the dynamic protection system places a limitation on the execution of the instance of that application.

37 Claims, 4 Drawing Sheets

METHOD AND SYSTEM FOR DYNAMIC SYSTEM PROTECTION

CROSS-REFERENCE TO RELATED APPLICATION(S)

This application claims the benefit of U.S. Provisional Application No. 60/547,415, filed on Feb. 23, 2004, entitled "METHOD AND SYSTEM FOR DYNAMIC SYSTEM PROTECTION," which is hereby incorporated by reference.

TECHNICAL FIELD

The described technology relates generally to dynamically detecting a security level of an application and applying security rules to prevent exploitation of vulnerabilities of the application based on the detected security level.

BACKGROUND

Although the Internet has had great successes in facilitating communications between computer systems and enabling electronic commerce, the computer systems connected to the Internet have been under almost constant attack by hackers seeking to disrupt their operation. Many of the attacks seek to exploit vulnerabilities of the application programs or other computer programs executing on those computer systems. One of the most destructive methods of attacking a computer system has been to send a "worm" to a computer program. A worm is a self-propagating attack that exploits a vulnerability by taking control of the computer system and using that computer system to launch attacks (i.e., send the same worm) against other computer systems with the same vulnerability. A worm is a message or sequence of messages designed to exploit a vulnerability of the receiving computer program. Upon receiving the message or messages, the computer program performs some action that allows the worm to take control of the computer system.

Developers of applications and administrators of computer systems go to great effort and expense to identify and remove vulnerabilities. Because of the complexity of applications, however, it is virtually impossible to identify and remove all vulnerabilities before applications are released. After an application is released, developers can become aware of vulnerabilities in various ways. A party with no malicious intent may identify a vulnerability in an application and may secretly notify the developer so the vulnerability can be removed before a hacker identifies and exploits it. If a hacker identifies a vulnerability first, the developer may not learn of the vulnerability until it is exploited—sometimes with disastrous consequences.

Regardless of how a developer finds out about a vulnerability, the developer typically develops and distributes to the system administrators "patches" that remove the vulnerability. If the vulnerability has not yet been exploited (e.g., might not be known to hackers), then a developer can design, implement, test, and distribute a patch in a disciplined way. If the vulnerability has already been widely exposed, then the developer often rushes to hastily distribute a patch without the same care that is used under normal circumstances. When patches are distributed to the administrators of the computer systems, they are responsible for scheduling and installing the patches to remove the vulnerabilities.

Unfortunately, computer systems are often not kept up-to-date with the most current patches, also referred to as security levels, for various reasons. For example, administrators often delay the installation of patches to remove vulnerabilities because of the time it takes to install the patch or because the patch may have unintended side effects that may be worse than the exploitation of the vulnerability itself. As another example, a computer network may allow "visiting" computers to connect to it. These visiting computers may have applications with very different security levels depending on how often their owners decide to install patches. If a vulnerability of an application on such a visiting computer is exploited, it may wreak havoc on the computer network.

SUMMARY

A method and system for restricting an instance of an application executing on a computer system is provided. A protection system identifies state information associated with the computer system. For example, the state information may be the version number of the operating system or patch level of the application. When the state information satisfies a certain condition, the protection system restricts the execution of the instance of the application. The restriction may be to prevent execution of the instance of the application or to limit the resources (e.g., the Internet) that the instance of the application can access.

DETAILED DESCRIPTION

Figure 1:
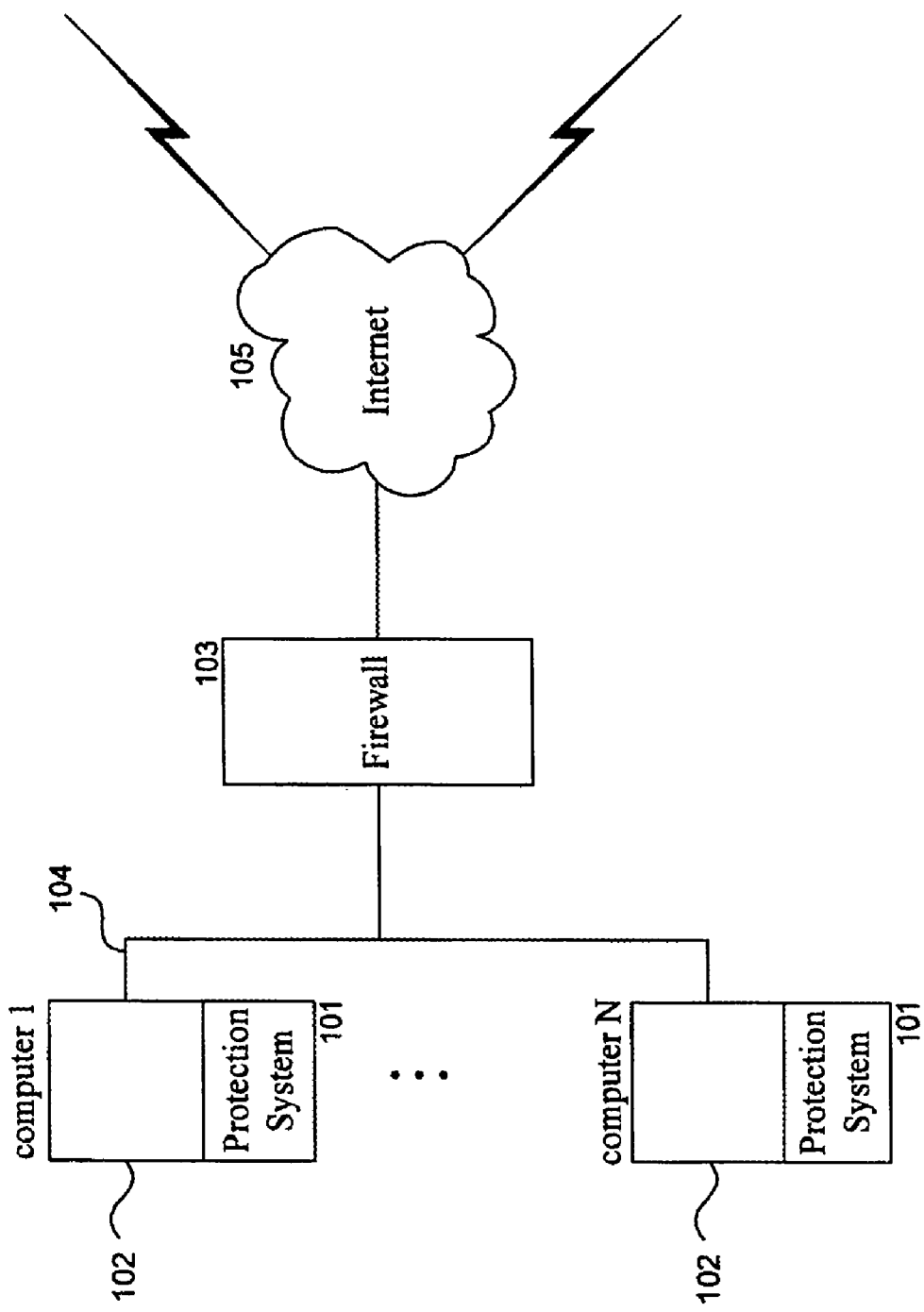
FIG. 1 is a block diagram illustrating an environment in which the dynamic protection system operates in one embodiment.

A method and system for dynamically protecting against exploitation of a vulnerability is provided. In one embodiment, the dynamic protection system identifies the security level of an instance of an application that is to execute on a computer system. If the security level of the instance of the application is not appropriate, the dynamic protection system places a limitation on the execution of the instance of that application. For example, if the security level of the instance of the application indicates that a patch to a vulnerability that has been exploited by a certain worm has not yet been installed, the dynamic protection system may check each communication sent to the instance of the application to determine whether it is infected with that worm. If infected, the dynamic protection system may drop the communication so that the vulnerability of the instance of the application is not exploited. As another example, if the security level indicates that a certain patch has not yet been installed, the dynamic protection system may restrict the resources (e.g., web sites) that the instance can access until that patch has been installed. The limitations placed on the instance of the application may be implemented by storing an agent on the computer system that hosts the instance of the application, by intercepting all communications to and from the host computer system, by configuring a firewall to limit access to resources by that instance, and so on. The dynamic protection system may also provide a message to a user of that instance indicating that a limitation has been placed on it and requesting the user to update the security level of the instance of the application. In this way, the limitations placed on an instance of an application can be tailored to the current security level of that instance.

In one embodiment, the dynamic protection system allows rules to be defined that specify the limitations to be placed on an instance of an application. The rules may be in the form of a condition and an action. If a condition is satisfied, then the action is performed. The conditions may specify a minimum security level (e.g., current version state) that is needed to avoid the performing of the action. For example, if a vulnerability of the application was patched in a security level release of 10.5, then a rule to prevent the exploitation of the vulnerability may indicate that its condition is satisfied with any security level less than 10.5. The rules may be ordered so that if the condition of one rule is not satisfied, then the dynamic protection system does not need to check any other rules. For example, if the rules are ordered based on decreasing security levels to which they are applicable, the dynamic protection system can avoid processing rules whose conditions are known to be not satisfied by the current security level.

In one embodiment, the dynamic protection system establishes the limitations when an instance of an application first starts executing. The dynamic protection system through the actions of the rules may implement the limitations via installation of code, setting of flags, sending of messages to an agent, and so on. As a result, when the instance of the application executes, the processing needed to ensure that a vulnerability is not exploited need only be performed for those vulnerabilities that have not been patched in that instance of the application. In particular, the implementation of the limitation can be tailored to the specific security level of the instance of the application and will not check for vulnerabilities that have already been patched. If an instance of an application is up-to-date, then the only overhead may be when the instance is started to see if any limitations need to be placed. Since none need to be placed, there may be no or very little overhead when resources are accessed by the instance.

The protection system may collect the security level information of an instance of an application in various ways. Security level information may be stored in an instance-specific configuration file or a central registry in an instance-specific entry. The security level information may also be maintained by a patch installation component of an operating system. The protection system can access the configuration file or registry or send a request to the patch installation component to retrieve the security level information of the instance of the application. Alternatively, the protection system may subscribe to a service that publishes security level information as changes are made to the security level of an instance of an application.

The protection system may operate in conjunction with a security engine that checks for the exposing of a vulnerability, for example, via a message sent to the instance of the application with a certain signature or via an invocation of an application programming interface with certain actual parameters. The security engine may enforce a security policy specified as rules that each include a condition and action. For example, a condition of a rule may specify that it is satisfied by a certain type of message with a field indicating a file size greater than 1024 bytes, and the action of the rule may specify that the message should be discarded. When the security engine receives a message, it checks the condition of each rule, and when a condition is satisfied, it performs a corresponding action. The condition may specify that it is satisfied only when the security level information meets certain criteria. For example, a condition may specify that it is satisfied only when the patch level of the instance of the application is below a certain level. If the patch level is below that level and any other criteria of the condition is met, then the security engine performs the action as a countermeasure. The protection system may collect the security level information for an instance of an application and provide it to the security engine for use in determining which conditions are satisfied.

The protection system may also provide notifications to users of an application that their instance has not been updated with the latest security patch. In such a case, the protection system may facilitate the downloading of a patch from a server of the organization that developed the patch. Alternatively, the protection system may inform the user that restrictions are being placed on the instance of the application until the latest security patch is installed. After the latest security patch is installed, the protection system may inform the user that the restriction has been removed. The protection system may also access the server of the organization that developed the patch to identify the history of patches for the application. The protection system may also download from that server rules to be used to prevent a vulnerability from being exposed based on the security level of an instance of the application.

FIG. 1 is a block diagram illustrating an environment in which the dynamic protection system operates in one embodiment. The dynamic protection system 101 may be implemented on each user computer 102 connected to a local area network 104. The user computers may access the Internet 105 via a firewall 103. Each user computer may also have a personal firewall. The dynamic protection system monitors the applications executing on the user computer. The dynamic protection system may use a firewall installed on the user computer system to restrict access of the instances of the application to resources. A user computer that is not connected to a local area network also may use the dynamic protection system. The dynamic protection system identifies the security level of that instance of the application and places limitations on its execution as appropriate. For example, the protection system may configure the firewall so that the instance of the application cannot access the Internet. The dynamic protection system may provide a mechanism for a system administrator to define the protection rules for applications or may download protection rules from servers of the developers of the applications.

Figure 2:
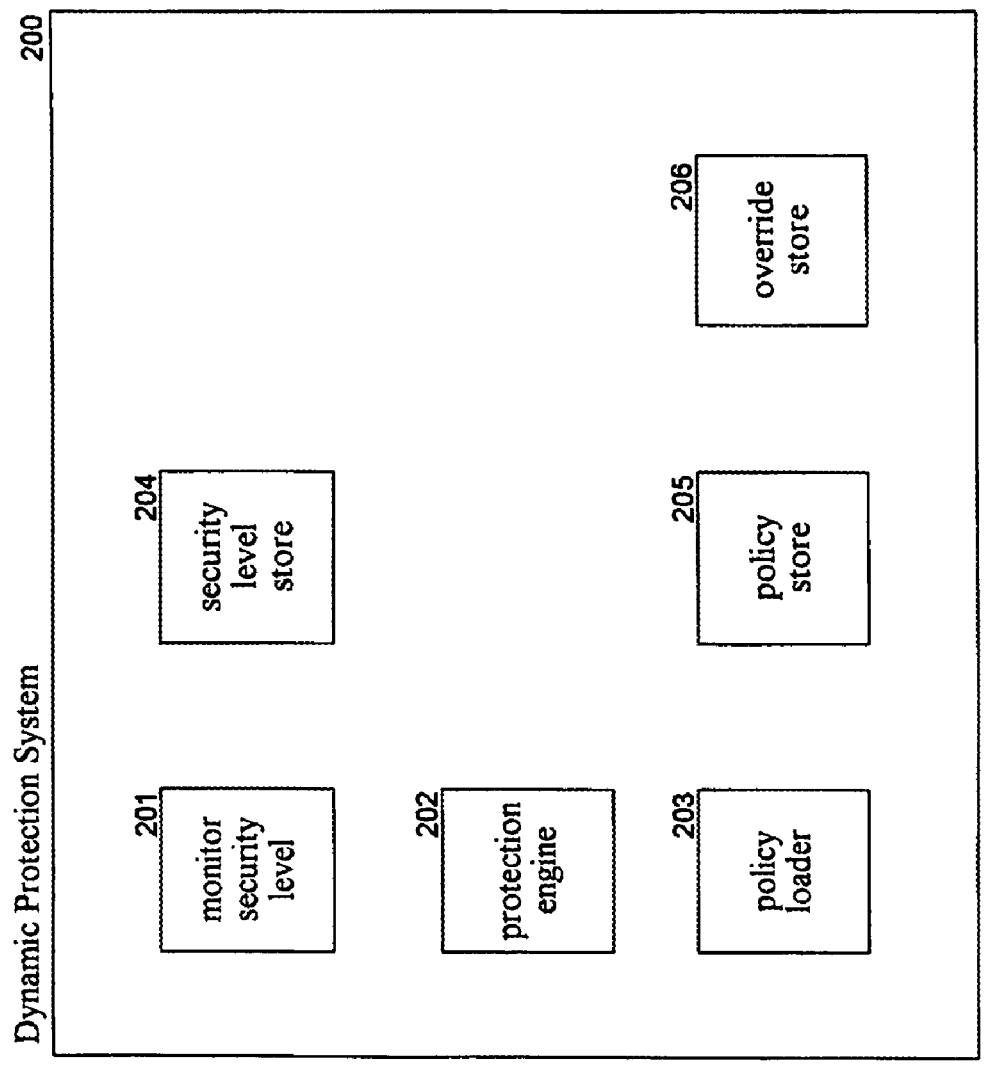
FIG. 2 is a block diagram illustrating components of the dynamic protection system in one embodiment.

FIG. 2 is a block diagram illustrating components of the dynamic protection system in one embodiment. The dynamic protection system 200 includes a monitor security level component 201, a protection engine 202, and a policy loader 203. The dynamic protection system also includes a security level store 204, a policy store 205, and an override store 206. The protection engine is notified when a user computer launches an instance of an application that may have a vulnerability. The protection engine invokes the monitor security level component to identify the security level of that instance of the application. The security level store may contain information describing the security levels of the applications. For example, the security level store may identify how to ascertain the security level of the application. The applications may store security level information in their local system registries that may be signed when the application or patch is installed in a way to ensure its authenticity. The monitor security level component ascertains the security level of the instance of the application in accordance with the information of the security level store. Once the security level of the instance of the application is ascertained, the protection engine retrieves the rules for that application from the policy store. The protection engine loops determining whether the conditions of the rules are satisfied and performing the action of the rules as appropriate. The actions may interact with the agent on the user computer system to install certain filters, to redirect communications of the user computer through another computer, to configure a firewall, and so on. The override store includes an indication of which rules of the policy store should be applied regardless of whether their conditions are satisfied. For example, a system administrator may not have much confidence that a certain patch will remove a vulnerability. In such a case, the system administrator may indicate to apply all rules related to that vulnerability. The policy loader inputs a description of a policy for limiting an application and stores that policy in the policy store. The policy loader may provide a user interface through which a system administrator can define the conditions and actions of the rules. In addition, the policy loader may download rules from the developers of applications.

The computing device on which the protection system is implemented may include a central processing unit, memory, input devices (e.g., keyboard and pointing devices), output devices (e.g., display devices), and storage devices (e.g., disk drives). The memory and storage devices are computer-readable media that may contain instructions that implement the protection system. In addition, data structures and message structures may be stored or transmitted via a data transmission medium, such as a signal on a communications link. Various communications links may be used, such as the Internet, a local area network, a wide area network, or a point-to-point dial-up connection.

The protection system may be implemented in various operating environments that include personal computers, server computers, hand-held or laptop devices, routers, switches, multiprocessor systems, microprocessor-based systems, programmable consumer electronics, network PCs, minicomputers, mainframe computers, distributed computing environments that include any of the above systems or devices, and the like.

The protection system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. The term "application" refers to any type of executing software such as drivers, kernel-mode code, operating systems, system utilities, web servers, database servers, and so on.

Figure 3:
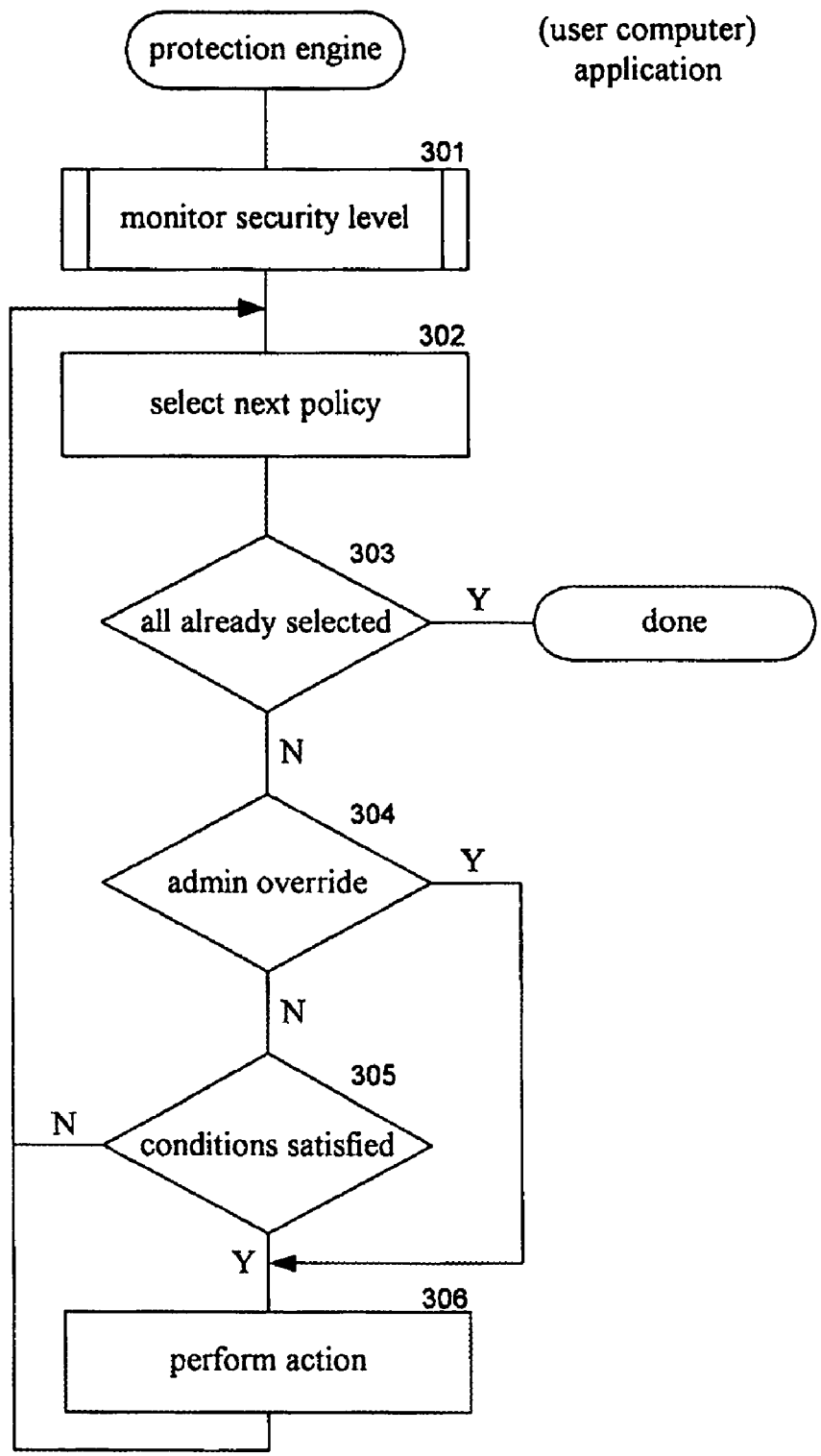
FIG. 3 is a flow diagram illustrating the processing of the protection engine in one embodiment.

FIG. 3 is a flow diagram illustrating the processing of the protection engine in one embodiment. The protection engine is passed an indication of the user computer and the application that is to be executed. In block 301, the component invokes the monitor security level component to ascertain the security level of the instance of the application. In blocks 302-306, the component loops determining which rules apply to the security level of the instance. In block 302, the component selects the next rule for that application. In decision block 303, if all the rules have already been selected, then the component completes, else the component continues at block 304. In decision block 304, if there is an administrative override associated with the rule, then the component continues at block 306, else the component continues at block 305. In decision block 305, if the condition of the selected rule is satisfied, then the component continues at block 306, else the component loops to block 302 to select the next rule. In block 306, the component performs the action associated with the selected rule and then loops to block 302 to select the next rule.

Figure 4:
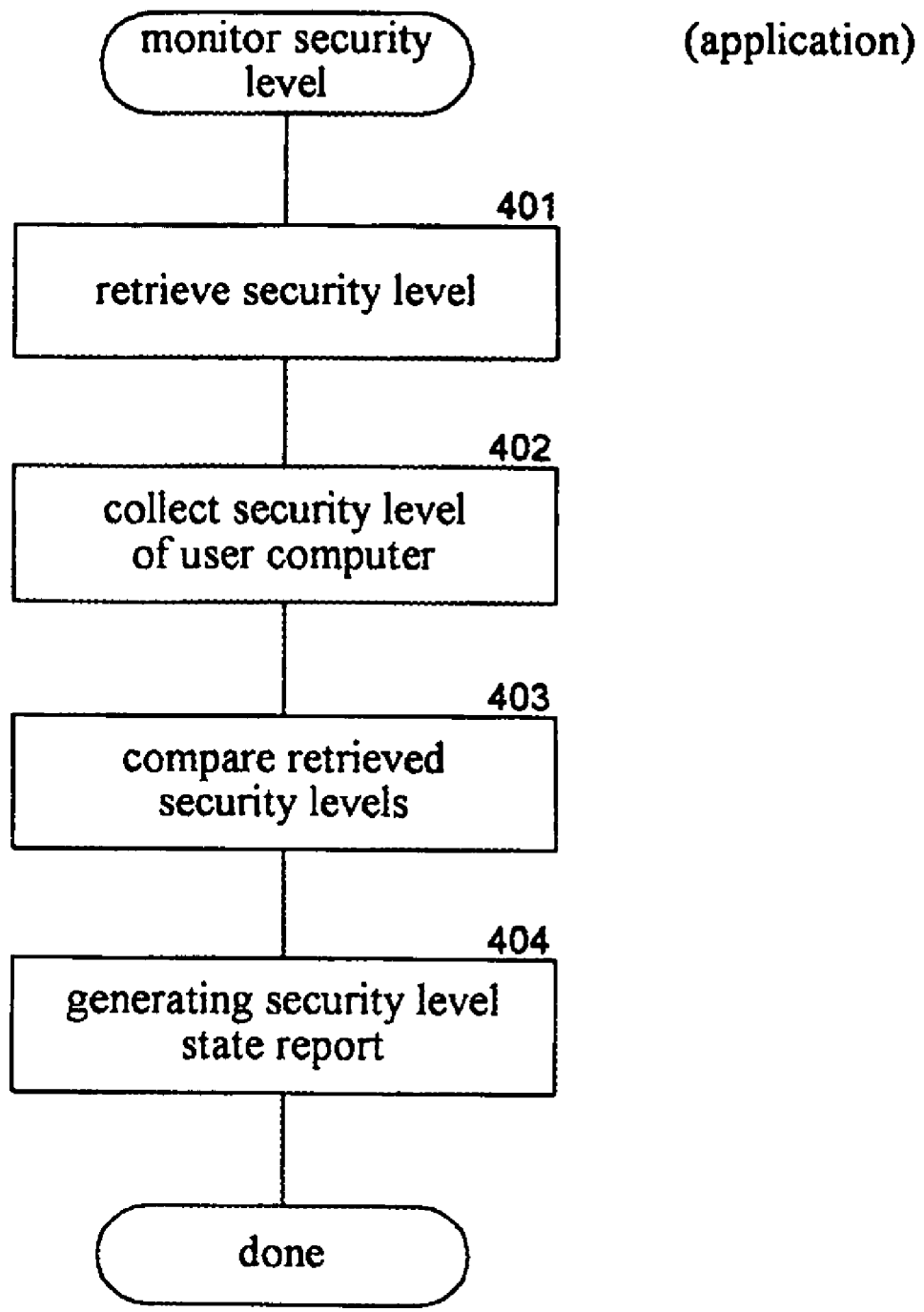
FIG. 4 is a flow diagram illustrating the processing of the monitor security level component in one embodiment.

FIG. 4 is a flow diagram illustrating the processing of the monitor security level component in one embodiment. This component may be passed an indication of the instance of an application whose security level is to be ascertained. In block 401, the component retrieves security level information for the application from the security level store. In block 402, the component collects the security level of the instance of the application from the user computer based on the retrieved security level information. In block 403, the component analyzes the retrieved and collected security levels. In block 404, the component generates a security level state report indicating the current security level of the instance of the application, which is used to determine the rules whose conditions are satisfied. The component then completes.

One skilled in the art will appreciate that although specific embodiments of the protection system have been described herein for purposes of illustration, various modifications may be made without deviating from the spirit and scope of the invention. For example, a limitation may be that the instance of the application has access only to a resource that will allow it to update to a more recent security level. Also, the condition may be based on state information other than security level such as the configuration of the host system or application instance, what resources are available to the host system, and so on. For example, the execution of an application may be restricted if the operating system has not been updated with the most recent patches, even though the application itself may be up-to-date. One skilled in the art will appreciate that the limitations placed on an instance of an application may be based on a vulnerability that has not yet been exploited. If so, then the rules may be based on a signature of a vulnerability. Otherwise, the rules may be based on a signature of the specific exploitation. For example, an unexploited vulnerability that is based on a certain type of object being loaded may be protected against by a rule that allows no objects to be loaded. Accordingly, the invention is not limited except by the appended claims.

We claim:

1. A method for protecting against an exploitation of a vulnerability of an application, the method comprising:
   providing security rules that each have a condition and an action, the condition relating to security levels such that when an instance of the application has a security level that satisfies the condition, the action is performed, the action for preventing the exploitation of a vulnerability of the application;
   determining the security level of an instance of the application; and
   for each rule, when the condition of the rule is satisfied by the determined security level, performing the action of the rule to prevent an exploitation of a vulnerability of the application
   further comprising providing an administrative rule that indicates that the action of a security rule is to be performed regardless of whether its condition is satisfied.

2. The method of claim 1 wherein the determining of the security level of an instance of the application is performed when the instance of the application first attempts to access a network resource after startup.

3. The method of claim 1 wherein the determining of the security levels of an instance of the application is performed when the computer system on which the instance of the application is installed connects to a network.

4. The method of claim 1 wherein the action includes establishing a protection scheme so that the instance of the application cannot access certain resources.

5. The method of claim 1 wherein the security level relates to patches for vulnerabilities of the application.

6. The method of claim 1 wherein the action includes establishing a protection scheme to intercept communications sent to the instance of the application and detect attempted exploitations of a vulnerability.

7. The method of claim 1 including providing a security level history of the application.

8. The method of claim 7 wherein the security level history of the application is provided by a developer of the application.

9. A method for protecting against an exploitation of a vulnerability of an application, the method comprising:
   providing security rules that each have a condition and an action, the condition relating to security levels such that when an instance of the application has a security level that satisfies the condition, the action is performed, the action for preventing the exploitation of a vulnerability of the application;
   determining the security level of an instance of the application; and
   for each rule, when the condition of the rule is satisfied by the determined security level, performing the action of the rule to prevent an exploitation of a vulnerability of the application
   wherein a rule indicates to display a message to a user indicating that a restriction is being placed on the instance of the application due to its security level.

10. The method of claim 9 wherein the message requests the user to bring the instance of the application to an updated security level.

11. A method for protecting against an exploitation of a vulnerability of an application, the method comprising:
   providing security rules that each have a condition and an action, the condition relating to security levels such that when an instance of the application has a security level that satisfies the condition, the action is performed, the action for preventing the exploitation of a vulnerability of the application;
   determining the security level of an instance of the application;
   for each rule, when the condition of the rule is satisfied by the determined security level, performing the action of the rule to prevent an exploitation of a vulnerability of the application; and
   notifying a user that a restriction has been placed on the application.

12. A computer-readable storage medium containing instructions for controlling a computer system to restrict an instance of an application, by a method comprising:
   identifying state information associated with the computer system; and
   when the identified state information meets a certain condition, restricting execution of the instance of the application.

13. The computer-readable storage medium of claim 12 wherein the application accesses resources and the restricting prevents the application from accessing a resource.

14. The computer-readable storage medium of claim 13 wherein the resource is a service that provides incoming messages to the application.

15. The computer-readable storage medium of claim 13 wherein the resource is a service that provides access to the Internet.

16. The computer-readable storage medium of claim 12 wherein the certain condition indicates the instance of the application has not been updated with a patch to prevent exploitation of a certain vulnerability.

17. The computer-readable storage medium of claim 16 wherein the restricting includes preventing a message that exposes the vulnerability from being sent to the instance of the application.

18. The computer-readable storage medium of claim 12 including notifying a user that the instance of the application is being restricted.

19. The computer-readable storage medium of claim 18 including notifying a user how to update the instance of the application to remove the restriction.

20. The computer-readable storage medium of claim 12 wherein the restricting is to prevent execution of the instance of the application.

21. The computer-readable storage medium of claim 12 including providing rules having a condition and an action and wherein the identifying determines whether a condition of a rule is satisfied and, if so, the restricting performs the action of the rule.

22. The computer-readable storage medium of claim 21 wherein the providing of rules includes retrieving the rules from a server of a provider of the application.

23. The computer-readable storage medium of claim 12 wherein the determining occurs when the application first attempts to access a network resource after startup.

24. The computer-readable storage medium of claim 12 including retrieving indications of available patches for the application.

25. The computer-readable storage medium of claim 24 wherein the indications of available patches are retrieved from a server of a provider of the application.

26. The computer-readable storage medium of claim 12 wherein the restricting includes notifying a security component that the condition has been met so that the security component can restrict execution of the application.

27. The computer-readable storage medium of claim 12 wherein the certain conditions relates to an update of an operating system executing on the computer system.

28. A computer system for protecting against an exploitation of a vulnerability of an application, comprising:
   a security rule store containing a security rule that defines a condition and a restriction to place on execution of an instance of an application that satisfies the condition to prevent exploitation of the vulnerability, the condition relating to a security state of the instance of the application;
   a component that collects the security state for the instance of the application; and
   a component that, when the collected security state satisfies the condition of the rule, places the defined restriction on execution of the instance of the application to prevent an exploitation of a vulnerability of the application.

29. The computer system of claim 28 wherein the component that collects the security state of the instance of the application collects the security state when the instance of the application first attempts to access a network resource after startup.

30. The computer system of claim 28 wherein the component that collects the security state of the instance of the application collects the security state when the computer system on which the instance of the application is installed connects to a network.

31. The computer system of claim 28 wherein the restriction prevents the instance of the application from accessing a resource.

32. The computer system of claim 28 wherein the security state relates to patches for vulnerabilities of the application.

33. The computer system of claim 28 wherein the restriction prevents a communication from being sent to the instance of the application that would expose the vulnerability.

34. The computer system of claim 28 including a component to provide a security history of the application.

35. The computer system of claim 34 wherein the security history of the application is provided by a developer of the application.

36. The computer system of claim 28 wherein the component that places the restriction displays a message to a user indicating that the restriction is being placed on the instance of the application due to its security state.

37. The computer system of claim 28 wherein the message requests the user to bring the instance of the application to an updated security state.

* * * * *